S. L. Herr,
Grinding Mills,
N° 3,524.    Patented Apr. 4, 1844.

UNITED STATES PATENT OFFICE.

SAML. L. HERR, OF MEXICO, PENNSYLVANIA.

MILL FOR GRINDING CORN AND COBS.

Specification of Letters Patent No. 3,524, dated April 4, 1844.

*To all whom it may concern:*

Be it known that I, SAMUEL L. HERR, of Mexico, in the county of Juniata and State of Pennsylvania, have invented a new and useful Improvement in Mills for Crushing and Grinding Corn; and I do hereby declare the following is a full, clear, and exact description thereof, reference being had to the accompanying drawings, which form a part of this specification, in which—

Figure 2:
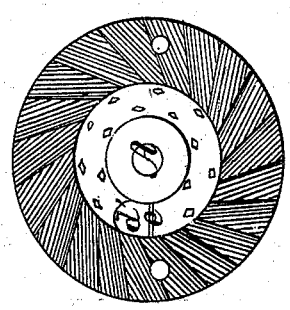
Figure 2:
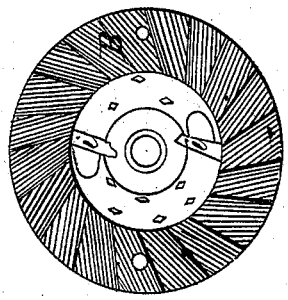
Figure 1:
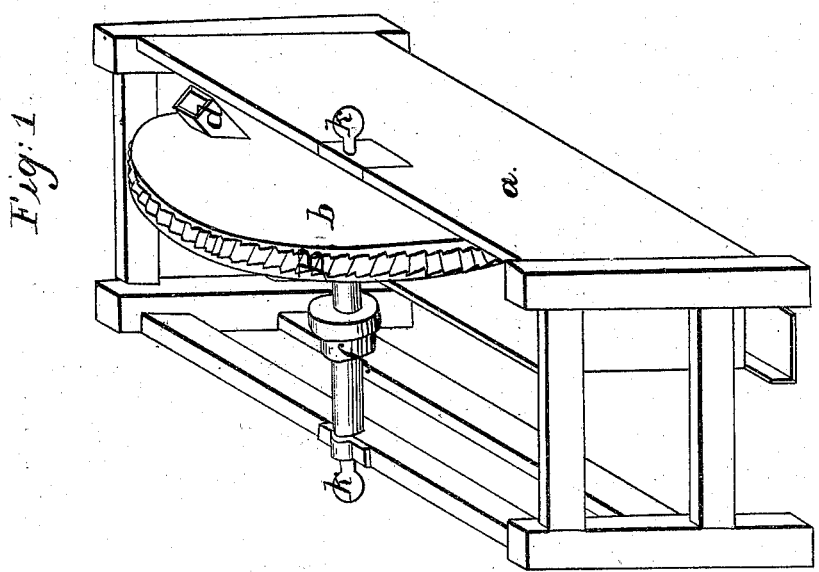

Figure 1 is the isometrical representation; Fig. 2, detached parts.

The nature of my invention consists in forming a corn and cob crusher and grinder by means of two vertical disks armed with teeth at the center and ribbed or channeled at their periphery the stationary one having a hopper therein and the blade of a shear and revolving disk carrying knives which cut against said stationary blade.

The construction is as follows: On a suitable frame $(a)$ is affixed a disk $(b)$ in a vertical position having a projection $(c)$ from its center on the outside and on one side of said projection a hopper $(d)$ through which the corn is fed into the machine. The projection $(c)$ is for the purpose of admitting a recess to be formed into the grinding face of the disk (as shown A, Fig. 2). For about one quarter the diameter around the center the disk is plain and projects a little, outside of which is a ring of about the same width recessed into the face and studded around with coarse projecting teeth; in this ring also is situated the aperture $(d')$ from the hopper along the lower edge of which is placed the stationary knife $(e)$ extending across the ring horizontally; beyond this ring are projecting ridges laid out similar to cast iron grinding mills of common construction gradually dishing out toward the periphery about half its width after which it is flat as shown in section Fig. 3.

The runner B, is cast with a shaft on which is a pulley $(f)$ by which it is driven, its outer end rests on the frame and it projects far enough through the grinding face of the runner to have a bearing in the recess of the stationary disk at the center as above named. Its grinding face is similar to the stationary one and is represented at B, Fig. 2, the differences between them being in the omission of the aperture for admission of grain and the center ring does not project. This disk is armed with two knives $(i)$ that cut against the stationary knife $(e)$ in the disk attached to the frame. The boxes in which the shaft of the runner turns being closed at their ends have screws $(k)$ through them which press against the ends of the shaft and adjust it more or less closely to the stationary disk.

Having thus fully described my machine, I wish it to be understood that I do not claim attaching knives to a runner as that has already been done, neither do I claim forming the disk with teeth and ribs which has been before effected. But

What I do claim is my invention and which I desire to secure by Letters is—

The combination of the teeth and ridges with the knives in the manner described the whole being constructed and arranged for the purpose set forth.

SAML. L. HERR.

Witnesses:
J. J. GREENOUGH,
L. CALDWELL.